(12) United States Patent
Nierenberg

(10) Patent No.: US 9,194,651 B2
(45) Date of Patent: Nov. 24, 2015

(54) RAIL MOUNT OFFHAND RECOIL GRIP

(71) Applicant: Robert Chester Nierenberg, Honolulu, HI (US)

(72) Inventor: Robert Chester Nierenberg, Honolulu, HI (US)

( * ) Notice: Subject to any disclaimer, the term of this patent is extended or adjusted under 35 U.S.C. 154(b) by 0 days.

(21) Appl. No.: 14/095,909

(22) Filed: Dec. 3, 2013

(65) Prior Publication Data
US 2014/0245648 A1   Sep. 4, 2014

Related U.S. Application Data

(63) Continuation-in-part of application No. 13/163,649, filed on Jun. 17, 2011, now abandoned.

(51) Int. Cl.
| | |
|---|---|
| *F41C 23/08* | (2006.01) |
| *F41C 23/06* | (2006.01) |
| *F41C 23/10* | (2006.01) |
| *B23C 3/00* | (2006.01) |
| *F41G 11/00* | (2006.01) |

(52) U.S. Cl.
CPC ............... *F41C 23/08* (2013.01); *F41C 23/06* (2013.01); *F41C 23/10* (2013.01); *B23C 3/00* (2013.01); *F41G 11/003* (2013.01); *Y10T 409/303752* (2015.01)

(58) Field of Classification Search
CPC .................................. F41C 23/16; F41C 23/08
USPC .................................................. 42/72; 89/1.42
See application file for complete search history.

(56) References Cited

U.S. PATENT DOCUMENTS

| | | | | |
|---|---|---|---|---|
| 7,464,495 | B2 * | 12/2008 | Cahill | 42/72 |
| 2009/0313873 | A1 * | 12/2009 | Roth | 42/72 |

* cited by examiner

*Primary Examiner* — Stephen M Johnson
(74) *Attorney, Agent, or Firm* — Forrest Law Office, P.C.

(57) ABSTRACT

An offhand recoil grip is described. In one disclosed embodiment, an offhand recoil grip has a mounting portion including a picatinny rail attachment portion, an attachment system to secure the mounting portion to a picatinny rail, and a lateral grip pad extending from the mounting portion with a substantially planar surface adjacent to the lateral grip pad, the lateral grip pad including a contoured portion to provide a thumb contact point for a non-trigger hand to reduce recoil when fired. Other embodiments are described involving a method of using a recoil grip, recoil grips with different attachments, for different weapons, etc.

7 Claims, 11 Drawing Sheets

RAIL MOUNT OFFHAND RECOIL GRIP

RELATED APPLICATIONS

This application is a continuation-in-part of prior U.S. application Ser. No. 13/163,649, filed Jun. 17, 2011, now abandoned.

BACKGROUND

1. Field of the Invention

The invention relates to a grip for a handgun or rifle. More specifically the invention relates to a grip that counters recoil.

2. Prior Art

When a gun is discharged, it is propelled backward in a motion commonly referred to as recoil. Depending on the size and type of a gun, recoil can detrimentally impact the aim of a subsequent shot from the gun. For example, a large caliber handgun will have significant recoil which will rotate the handgun up and over the hand of a shooter, resulting in the shooter needing to then orient the handgun to aim back at an intended target. Rifles are also subject to detrimental impacts on aim for subsequent shots due to their large caliber, due to repeating rifles like semi-automatic or fully-automatic weapons, smaller stocks used in urban assault or sport settings, and the like.

SUMMARY

Accordingly, an improved method and apparatus for an offhand recoil grip is described below in the Detailed Description. For example, one disclosed embodiment provides an offhand recoil grip having a mounting portion including a picatinny rail attachment portion, an attachment system to secure the mounting portion to a picatinny rail, and a lateral grip pad extending from the mounting portion with a substantially planar surface adjacent to the lateral grip pad, the lateral grip pad including a contoured portion to provide a thumb contact point for a non-trigger hand to reduce recoil when fired.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
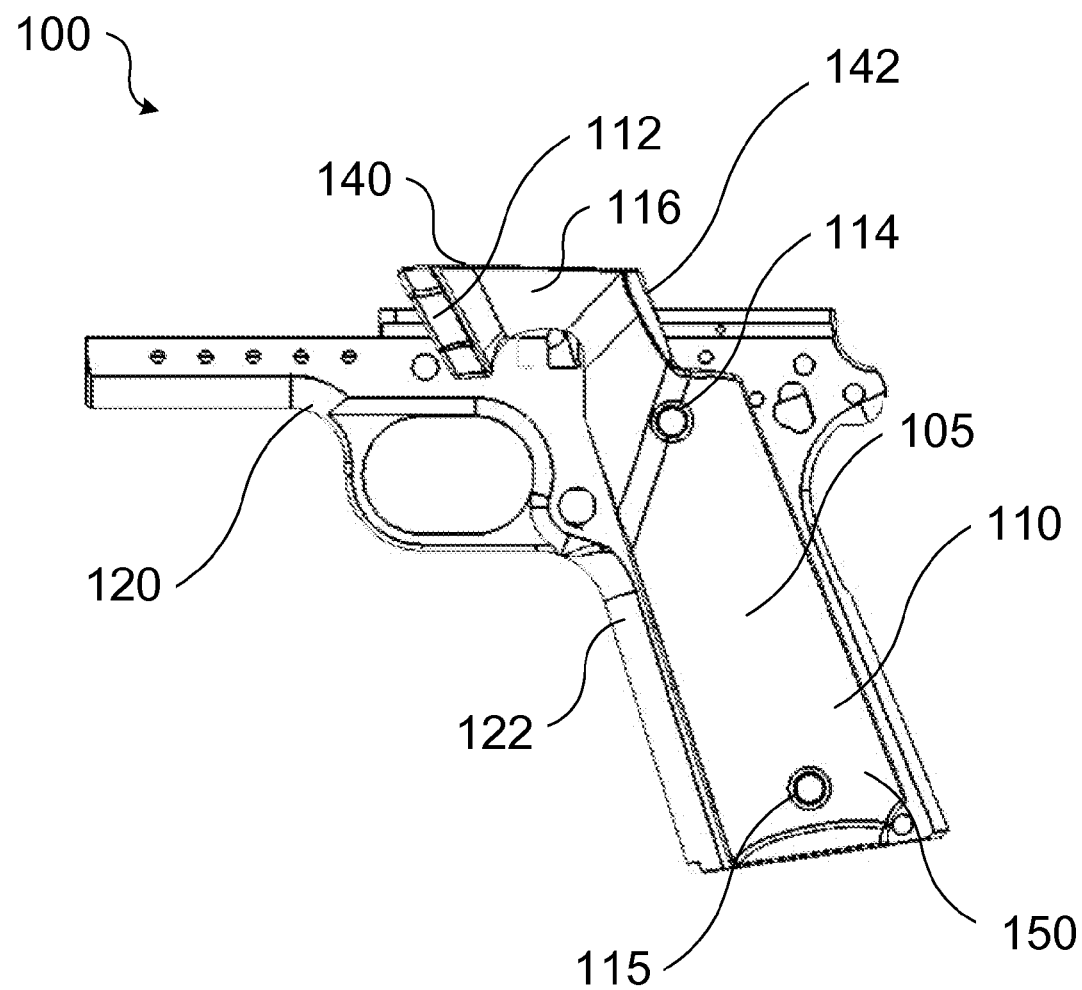
FIG. 1 shows a side elevation view of a first embodiment of a recoil grip mounted on an M1911 pistol frame.

FIG. 1 shows a side elevation view of a first embodiment of a recoil grip 110 mounted on an M1911 pistol frame of handgun 120. Generally, a recoil grip may be affixed through established fastening locations, with a picatinny rail, to a frame, through a dovetail attachment, or any other suitable permanent, semi-permanent or adjustable connection to a handgun, a rifle, or other weapon.

In the embodiment depicted in FIG. 1, an offhand recoil grip 110 is shown comprising a mounting portion 105 including a plurality of holes 114 and 115, where each of the plurality of holes defines a surface extending through the mounting portion 105 to receive a fastener to couple the mounting portion 105 to a grip mount 122 of a handgun. For example, the plurality of holes may comprise two holes such as for an M1911 pistol to then allow fastening through the factory grip attachments. In other embodiments the lateral grip pad may have a number of holes corresponding to other handgun grip attachments, or may even have additional or less holes, to allow a wider range of attachment mechanisms. In some embodiments, holes 114 and 115 are slots to allow adjustment of the offhand recoil grip 110 on a handgun frame.

Figure 3:
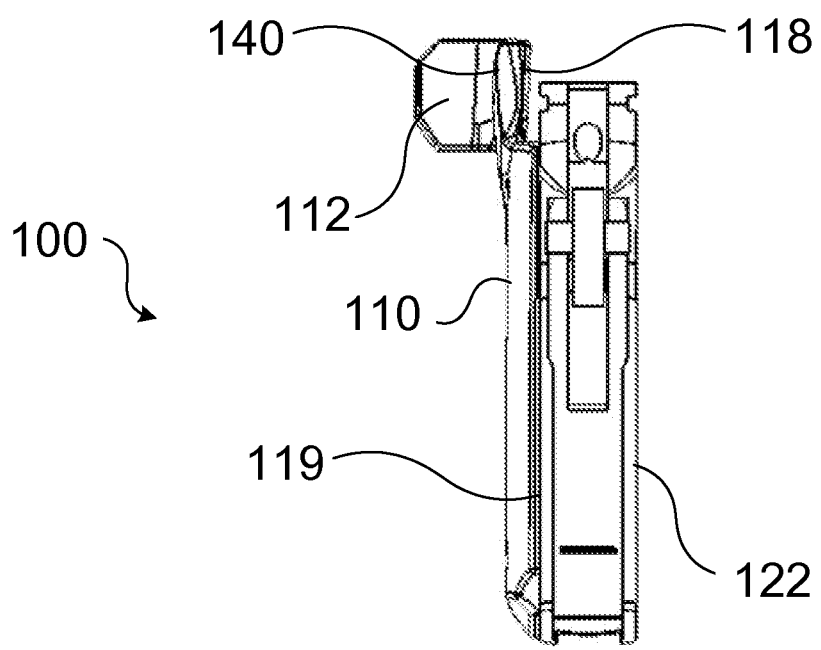
FIG. 3 shows a rear elevation view of the first embodiment of a recoil grip mounted on an M1911 pistol frame.

With reference to the embodiment in FIG. 1, the mounting portion 105 has a first planar surface 119 (as shown in FIG. 3) to contact the grip mount 122 of the handgun when the mounting portion 105 is fastened to the handgun. The mounting portion 105 has a front portion 140 oriented toward the barrel side of the handgun and a rear portion 150 oriented toward the back of the grip mount 122 of the handgun. In some embodiments an offset support portion 116 extends from the mounting portion 105 toward the top and front of the handgun, with the offset support portion 116 further having a second planar surface 118 (shown in FIG. 3) offset from the first planar surface 119 of the mounting portion 105 to allow a slide to move between the recoil grip 110 and a receiver of the handgun 120. In some embodiments, the offhand recoil grip comprises a monolithic structure. By way of example, the offhand recoil grip may be milled from a single piece of aluminum or other suitable grip materials. For example, the offhand recoil grip may be milled or injection molded reinforced polymer, light weight metals, alloys, or may be cast or case-hardened or heat treated steel, as well as other suitable grip materials.

In some embodiments, recoil grip 110 includes a lateral grip pad 112 coupled to the offset support portion 116, the lateral grip pad extending laterally away from the grip mount of the handgun to provide a thumb contact point for a non-trigger hand to reduce recoil in a handgun when fired. In some embodiments, the lateral grip pad 112 is positioned between a slide stop spindle axis of the handgun and the grip mount of the handgun.

In the embodiment depicted in FIG. 1, the lateral grip pad 112 has a contoured surface 140 to control recoil flip and to control windage. In this way, at least a portion of lateral grip pad 112 or offset support portion 116 may have a contour or surface texture to provide control on the handgun in addition to recoil control. In this way, the recoil grip can be used to control elevation changes due to recoil, to control windage, or to control any combination of these two elements as well as other rotations or movements of the handgun. Contoured surface 140 enables the strong flexors and radial deviators of an off-hand thumb to oppose the forces applied from palmar surfaces of the index through ring fingers of the off-hand as well as to oppose the shooting hand palmar surfaces to improve gripping leverage and to counter recoil induced torque on a handgun. In some embodiments, lateral grip pad 112 is placed close to the bore axis of the handgun barrel to reduce the counter torque required to control flip. Contour 140 naturally positions the thumb to point slightly inward and thus placing a vector of counter force from the thumb in a slightly inward direction toward the handgun. Therefore, contour 140 and lateral grip pad 112 can coordinate to provide control in all three axes of recoil components, including flip, windage or yaw error, and twist or barrel axial rotation. Further, by increasing control of the handgun with the off-hand, a shooter can relax their shooting hand and thereby improve trigger control.

In some embodiments, the offhand recoil grip may further comprise a thumb rest 142 for the triggering hand. For example, the thumb rest 142 for the triggering hand may be a surface on the back of the offset support portion 116. In this way, a user of the handgun can place either their offhand thumb on lateral grip pad 112 or the thumb of their triggering hand on thumb rest 142. The present embodiment is shown for a right-handed shooter, but some embodiments may be used on the opposite side of a handgun for a left-handed shooter.

Figure 2:
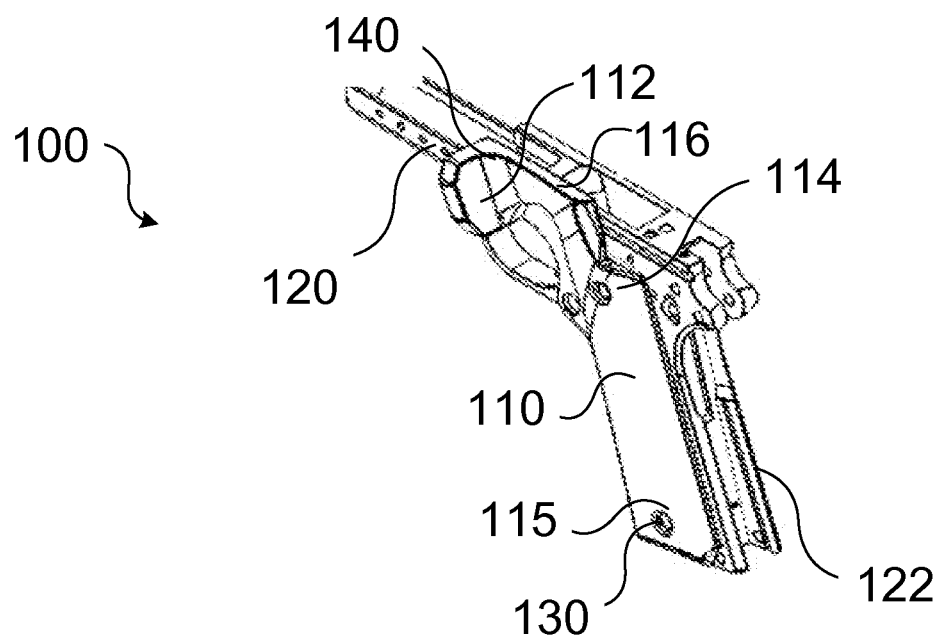
FIG. 2 shows a perspective view of the first embodiment of a recoil grip mounted on an M1911 pistol frame.

FIG. 2 shows a perspective view of the first embodiment of a recoil grip mounted on an M1911 pistol frame as also shown in FIG. 1. In this view, the contoured surface 140 can be seen from a different angle as a curved surface between lateral grip pad 112 and offset support portion 116. Additionally, screw 130 is shown placed through the surface defined by hole 115 to connect the mounting portion 105 or recoil grip 110 to the grip mount 122 of a handgun, however other embodiments are not limited in this way. For example, a recoil grip may be bonded to a grip mount 122 of handgun while still allowing offset support portion 116 to not interfere with field stripping the handgun.

Figure 4:
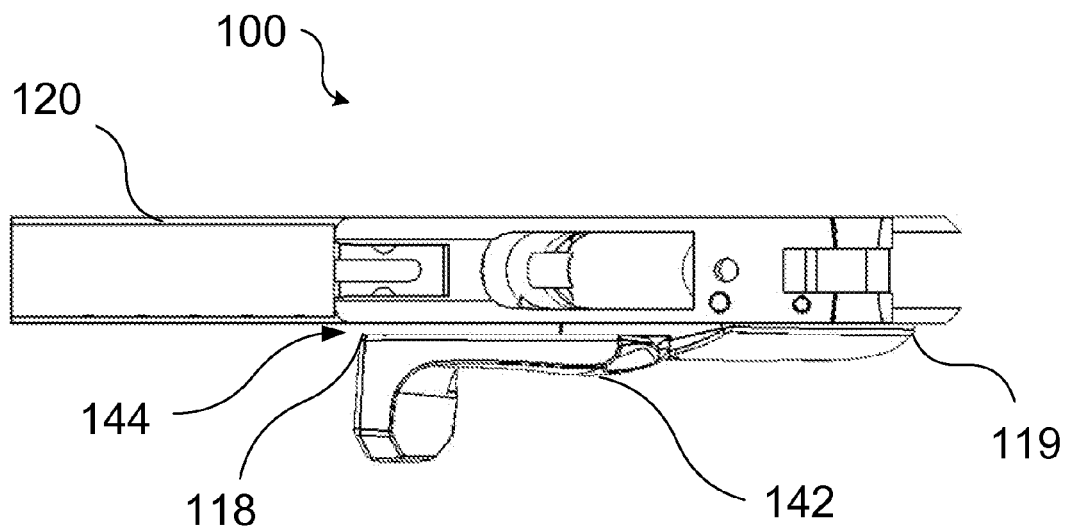
FIG. 4 shows a top elevation view of the first embodiment of a recoil grip mounted on an M1911 pistol frame.
Figure 5:
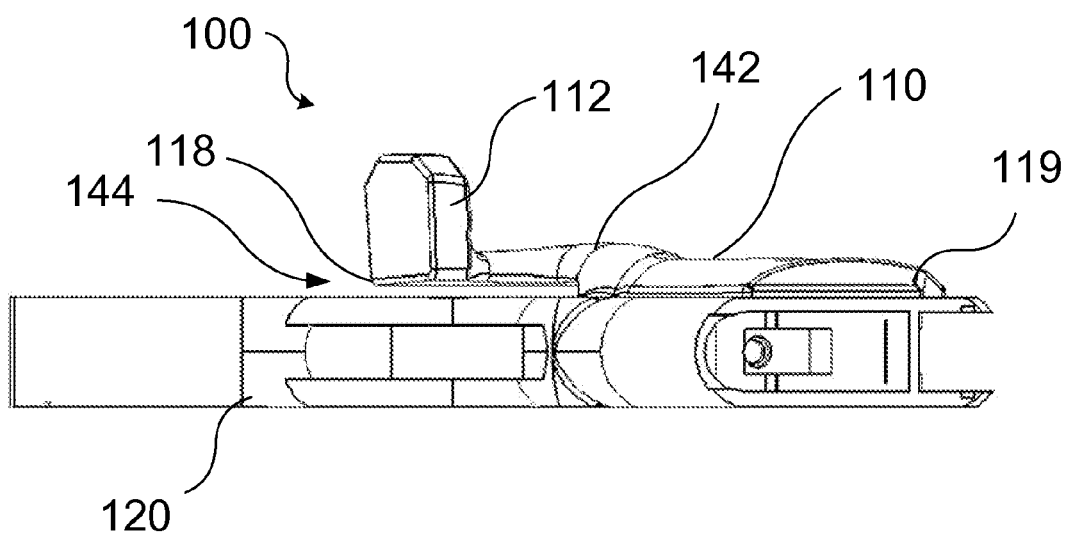
FIG. 5 shows a bottom elevation view of the first embodiment of a recoil grip mounted on an M1911 pistol frame.

FIGS. 3-5 show a rear elevation view, a top elevation view, and a bottom elevation view of the first embodiment of recoil grip 110 mounted on an M1911 pistol frame. FIG. 3 shows a first planar surface 119 to contact the grip mount 122 of the handgun when the recoil grip 110 is fastened to the handgun. A second planar surface 118 is also shown on the handgun side of offset support portion 116, where the second planar surface 118 is offset from the first planar surface 119 to allow clearance for a slide for handgun 120 to move between the receiver of handgun 120 and recoil grip 110. FIG. 4 and FIG. 5 illustrate a gap 144 between the second planar surface 118 of offset support portion 116 and the handgun 120. Additionally, FIGS. 4-5 illustrate an additional contour 142 of offset support portion 116 that works in conjunction with contour 140 to provide additional control over handgun for windage, elevation, rotation, etc.

Figure 6:
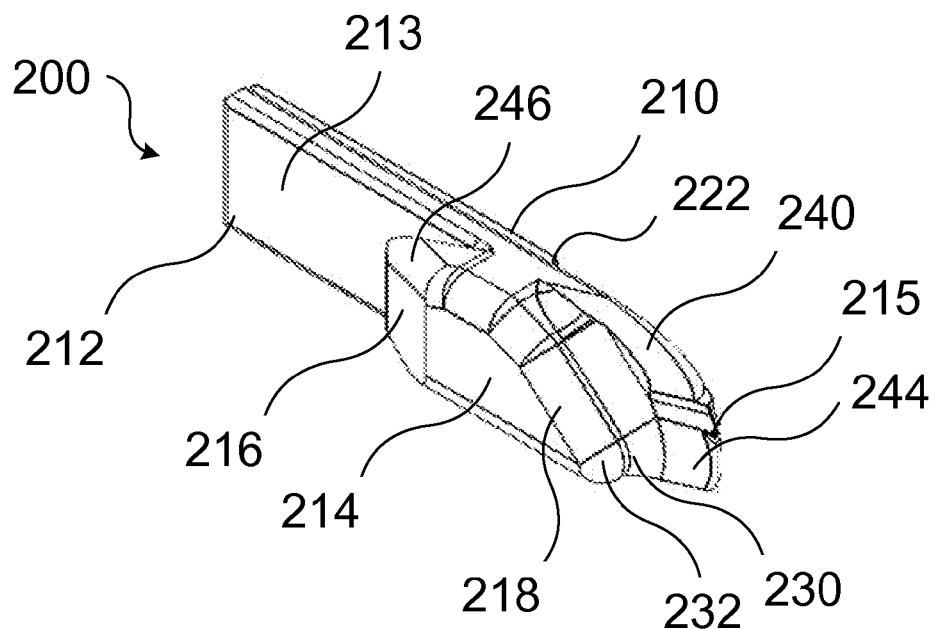
FIG. 6 shows a perspective view of a dovetail embodiment of a recoil grip.
Figure 9:
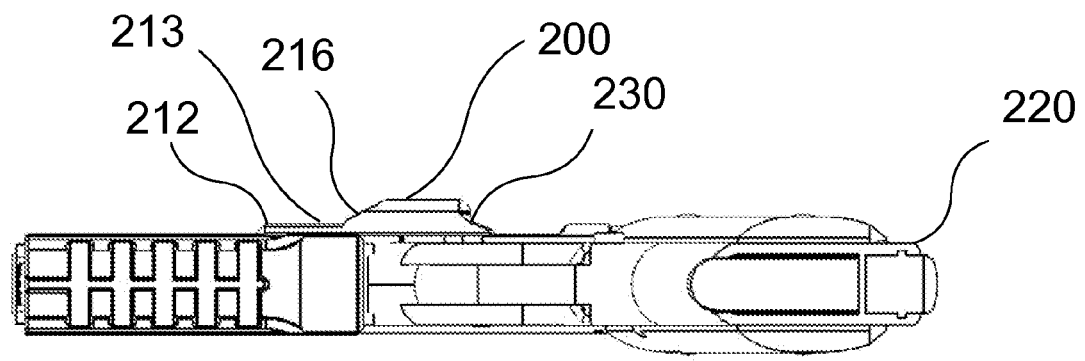
FIG. 9 shows a bottom elevation view of the dovetail embodiment of a recoil grip mounted on an M1911 pistol frame.

FIG. 6 shows a perspective view of a dovetail recoil grip 200 having a front end 212 and a back end 215. The dovetail embodiment has a lateral grip pad 218 on a lateral protrusion 214. The present embodiment also has a dovetail attachment 210 as shown more clearly in FIG. 7 from a view looking directly at the front end 212 of dovetail recoil grip 200. Dovetail recoil grip 200 also has a contoured portion 230 connecting lateral grip pad 218 with the main body of the recoil grip. FIG. 9 shows a bottom view of the contoured portion 230. Contoured portion 230 assist in control of windage as well as elevation in similar fashion to contour 140 in the embodiment depicted in FIG. 1.

Figure 7:
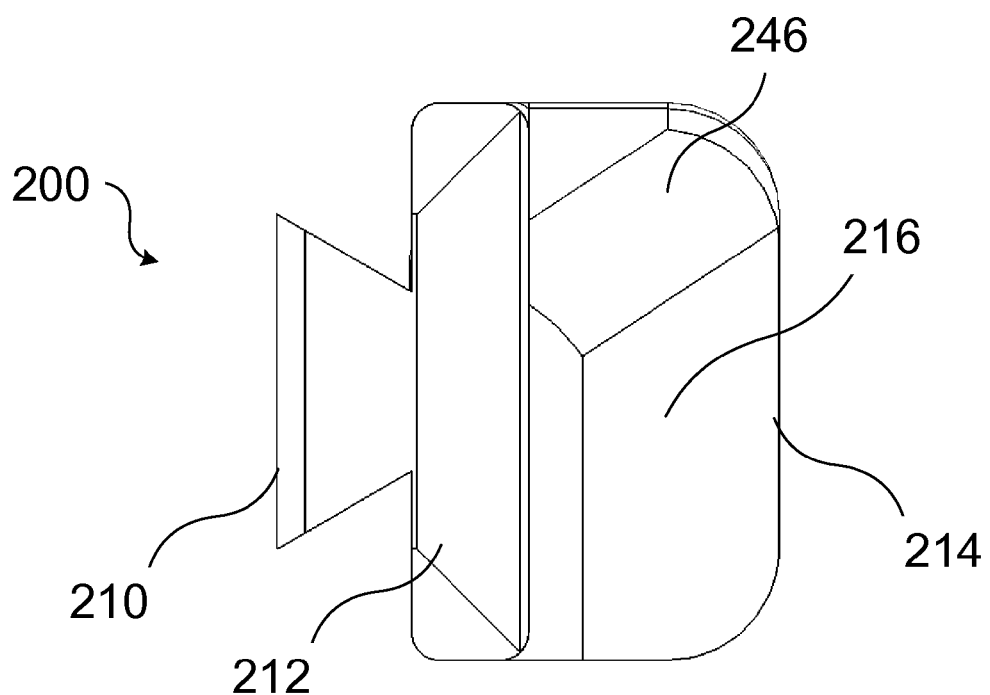
FIG. 7 shows an end elevation view of the dovetail embodiment of a recoil grip.

In some embodiments, dovetail recoil grip 200 includes a substantially flat front outer surface 213. Front outer surface 213 provides an attachment to a handgun or rifle with a limited protrusion. In this way, lateral grip pad 218 and contoured portion 230 may provide an offhand recoil grip while front outer surface 213 does not obstruct use or movement of the handgun or rifle. Additionally, lateral protrusion 214 may have a substantially flat surface projecting away from the handgun or rifle and may be relatively co-planar with front outer surface 213. Lateral protrusion 214 may also have a first front ramped portion 216 and a curved ramp portion 246 to provide a gradual transition between the front of the dovetail recoil grip 200, or from a front outer surface 213, to the lateral protrusion 214. A gradual transition aids in use of the handgun or rifle to not catch on holsters, clothing, or in any way that can alter firing or using the handgun or rifle. Curved ramp portion 246 and front ramped portion 216 are also illustrated in FIG. 7. In some embodiments, curved ramp portion 246 intersects front ramped portion 216 at a non-orthogonal angle with respect to the substantially flat surface of lateral protrusion 214, but other embodiments may have an orthogonal or other relationship between the interface of curved ramp portion 246 and front ramped portion 216.

In reference to FIG. 6, the rear end of dovetail attachment 210 is placed forward, with respect to the handgun or rifle, of lateral grip pad 218. This allows a forward mounting portion and a placement of the lateral grip pad closer to the off-hand. For example, with reference to FIG. 8, lateral grip pad 218 is illustrated being situated behind the front of the trigger guard 260 with reference to the barrel opening being the front, and is also situated in front of trigger 262. However, other embodiments may have lateral grip pad partially within this region or even outside of this region. In reference to FIG. 9, contoured portion 230 is shown behind the front of trigger guard 260 and in front of trigger 262 in similar fashion. Additionally, the substantially flat surface of lateral protrusion 214 can be seen at the top of the figure. FIG. 9 also illustrates the front ramped portion 216 as seen from the bottom of the handgun.

Figure 8:
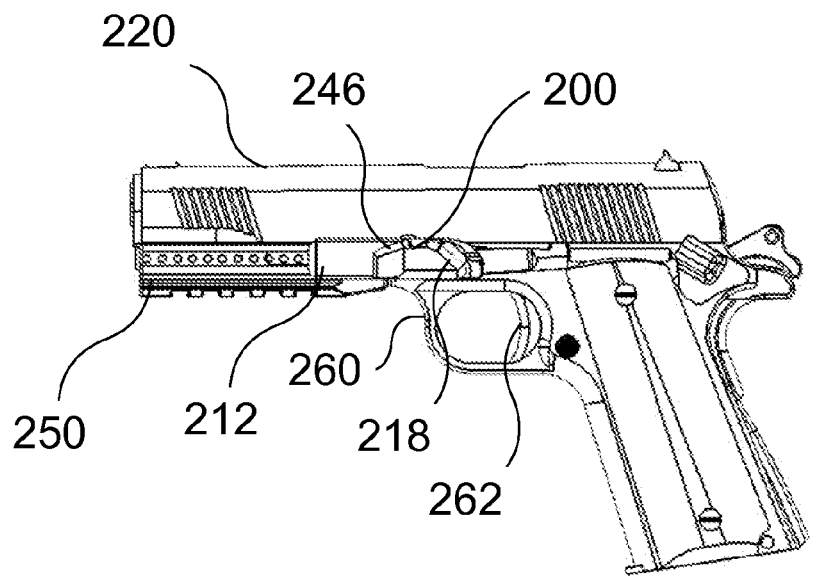
FIG. 8 shows a side elevation view of the dovetail embodiment of a recoil grip mounted on an M1911 pistol frame.

FIG. 8 shows a side elevation view of the dovetail recoil grip 200 mounted on an M1911 pistol 220. Pistol 220 includes a dovetail groove 250 for affixing additional components. The dovetail attachment 210 of dovetail recoil grip 200 fits within dovetail groove 250 with the front end 212 of the recoil grip positioned toward the front of the barrel of pistol 220 such that lateral grip pad 218 and contoured portion 230 face the back of pistol 220 to allow an offhand thumb rest to control pistol 220.

Figure 10:
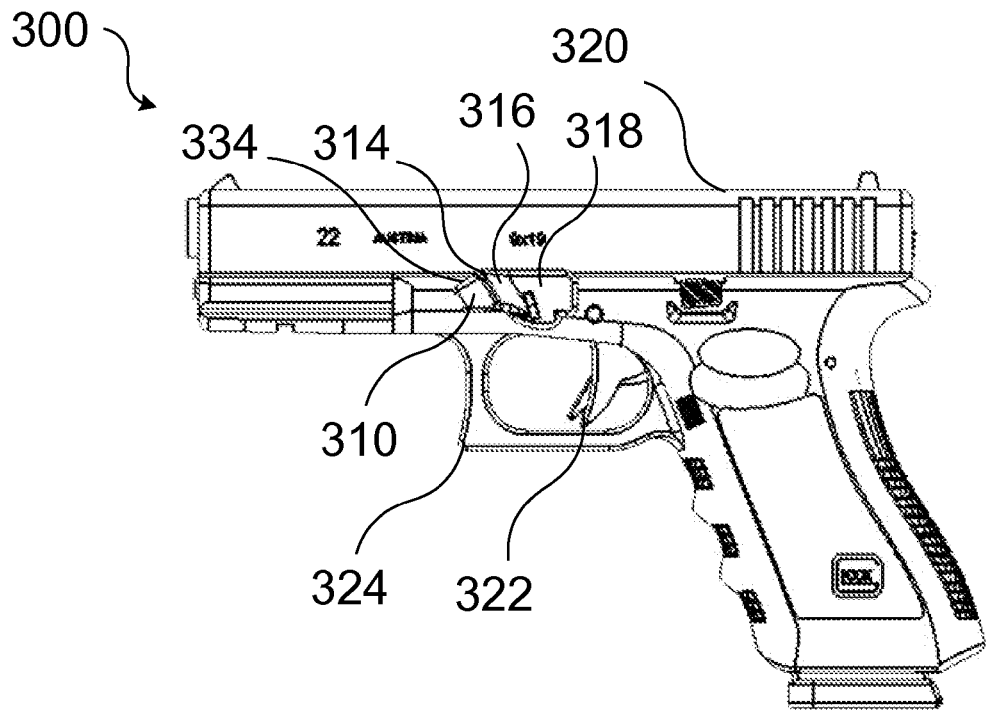
FIG. 10 shows a side elevation view of a frame bump embodiment of a recoil grip mounted on a GLOCK pistol frame.

FIG. 10 shows a side elevation view of a frame bump 310 recoil grip on the frame of a handgun 320. In the illustrated embodiment, frame bump 310 is connected directly to the frame of a handgun and allows placement of a recoil grip in custom places such as where there is no picatinny rail, no dovetail attachment, in more places than conventional post-factory mounting places, etc. For example, a frame bump may be manufactured, milled or molded, etc. as a monolithic part of a handgun frame or a rifle frame. In some embodiments a frame bump may be attached to a frame or made as a solitary unit with a frame through other processes. For example, a frame bump may comprise a lateral wall and a contoured section and one or more grip pads as described with respect to other embodiments disclosed herein.

With reference to the embodiment illustrated in FIG. 10, frame bump 310 includes a contoured section 316 situated on the side of handgun 320 and with a reference as the front of a handgun having the barrel exit and the handle end of the pistol being the rear of a handgun, the contoured section lies between the trigger guard 324 and the trigger 322. That is, in this embodiment the contoured section lies toward the back of the handgun from the trigger guard 324 and toward the front of the handgun from the trigger 322, while still being situated on the side of the handgun frame. In the illustrated embodiment, frame bump is monolithically attached to the handgun frame and includes a contoured section that includes a curved surface from the outside of frame bump 310 to a lateral wall 318 which is substantially coplanar with the side of the handgun frame. In some embodiments, lateral wall 318 may be a curved surface or non-planar, may be at a non-coplanar angle to handgun frame, may have surface geometries including one or a combination of convex and concave elements, etc. In some embodiments, frame bump 310 may partially overlap with trigger guard 324 or the area adjacent trigger guard 324 or trigger 322 or may partially overlap the slide of the handgun without impeding its movement.

With reference to the figure, frame bump 310 includes front ramped portion 330 and front curved edge 334. Front ramped portion 330 and front curved edge create a smooth profile to allow use of the handgun while reducing catching on holsters, clothing, etc. In the present embodiment, front curved portion is also placed at an angle sloping down toward the front of the handgun when the handgun is held. This in turn creates a front top surface that is also at an incline and can also aid in reducing catching of the handgun on holsters, clothing, etc. Additionally, frame bump 310 may have a top curved edge 336 bounding contoured portion 316 and lateral wall 318. In similar fashion to front curved edge 334, a top curved edge 336 can reduce catching and can also provide a tactile alignment for a thumb placed onto frame bump 310.

The curved surface of contoured section 316 includes an angle wherein the top of the curved surface is nearer to the front of the handgun (barrel exit end) and the bottom of the curved surface is nearer the back of the handgun (handle end). In some embodiments the curved surface may substantially be a curved plane, a partially convex or concave curved surface, or a surface with multiple concave and/or convex surface geometries. Additionally, the curved surface of contoured section 316 may extend to the outside portion of frame bump 310 or may not completely extend to the outside portion of frame bump. Likewise, the curved surface of contoured section 316 may not extend completely to lateral wall 318, may extend to lateral wall 318, etc.

Figure 11:
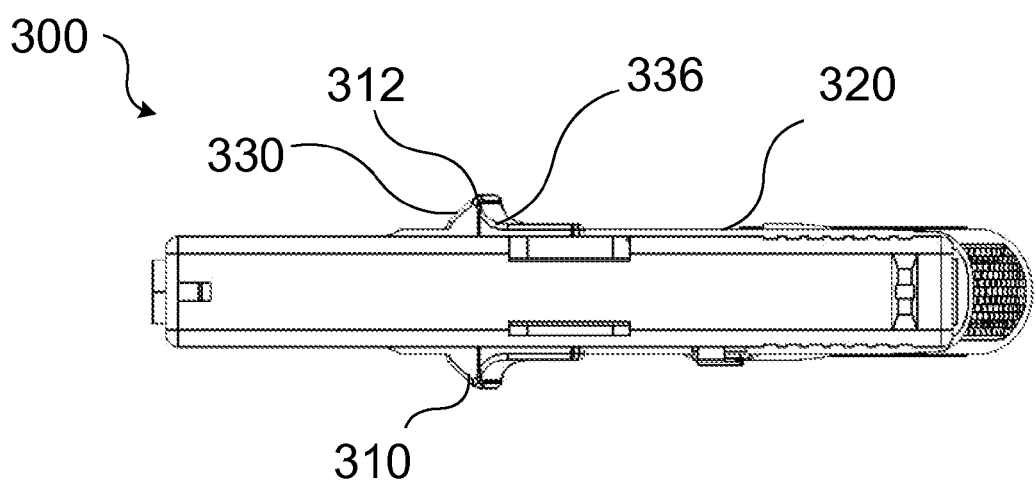
FIG. 11 shows a top elevation view of the frame bump embodiment of a recoil grip mounted on a GLOCK pistol frame.

In some embodiments, a frame bump may be attached to the handgun frame through screws, rails, bonding, or other techniques, or a frame bump may be an off-hand recoil grip that is part of a monolithic structure of the handgun frame. FIG. 11 illustrates two recoil grips, frame bump 310 and frame bump 312, as may be used in some embodiments, but other embodiments are not so limited and a frame bump may be used on one side of the handgun frame.

Figure 12:
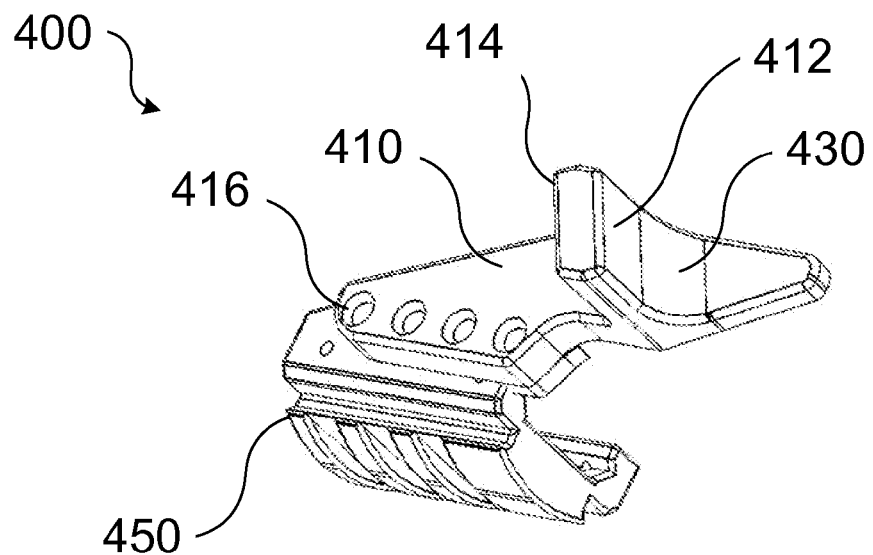
FIG. 12 shows an offset perspective view of a picatinny rail embodiment of a recoil grip.
Figure 13:
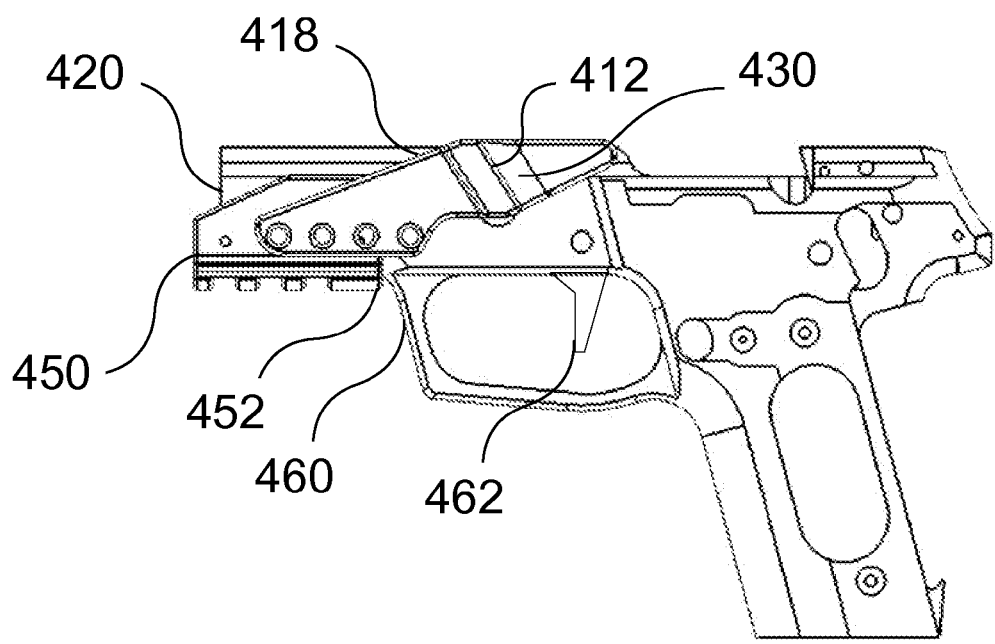
FIG. 13 shows a side elevation view of the picatinny rail embodiment of a recoil grip mounted on a SIG SAUER pistol frame.

FIGS. 12-13 show an embodiment of a picatinny rail recoil grip 400 for a handgun. Picatinny rail recoil grip 400 includes a picatinny rail attachment 450, a lateral grip pad 412 and a contoured section 430. In some embodiments, picatinny rail recoil grip 400 may comprise separate components for picatinny rail attachment 450 and recoil grip 410. In this way an offhand recoil grip may be interchanged with another offhand recoil grip and connected to a handgun using the same picatinny rail attachment 450.

By way of example, a recoil grip having a different geometry may be interchanged. In this way, the lateral grip pad 412 may be in a different place or position on the recoil grip and can be used for different shooting uses, for different users hand sizes and a different contoured section 430 may be used to provide a tailored control of windage, elevation, etc. while using the same picatinny rail attachment. In other embodiments the picatinny rail recoil grip 400 may have a monolithic structure. FIG. 13 shows picatinny rail recoil grip 400 affixed to a frame of handgun 420.

Picatinny rail recoil grip 400 may comprise multiple parts. For example, picatinny rail attachment 450 may be connected to recoil grip 410 by way of fastening system 416. Multiple parts allows a recoil grip of a different geometry, length, material or general design to be attached to a picatinny rail attachment and allows a greater range of recoil grip embodiments.

In some embodiments, picatinny rail recoil grip 400 includes a front ramped portion 418 to allow less restricted use and movement of a handgun or rifle. In the illustrated embodiment, picatinny rail recoil grip 400 includes a lateral grip pad 412 situated toward the back of the handgun from the front of trigger guard 460 and toward the front of the handgun from trigger 462. However, other embodiments are not so limited and may have lateral grip pad 412 situated partly within this region or even outside of it. For example, lateral grip pad 412 may be located behind trigger guard 460 and in front of the handle of the handgun, as one example. In other embodiments, lateral grip pad may extend outside these regions or be outside of these regions. In the current embodiment, lateral grip pad 412 is situated behind the back 452 of picatinny rail attachment. This allows placement of the lateral grip where it suits an off-hand placement while not being restricted by the mounting length of a picatinny rail or the placement of a picatinny rail attachment.

Figure 14:
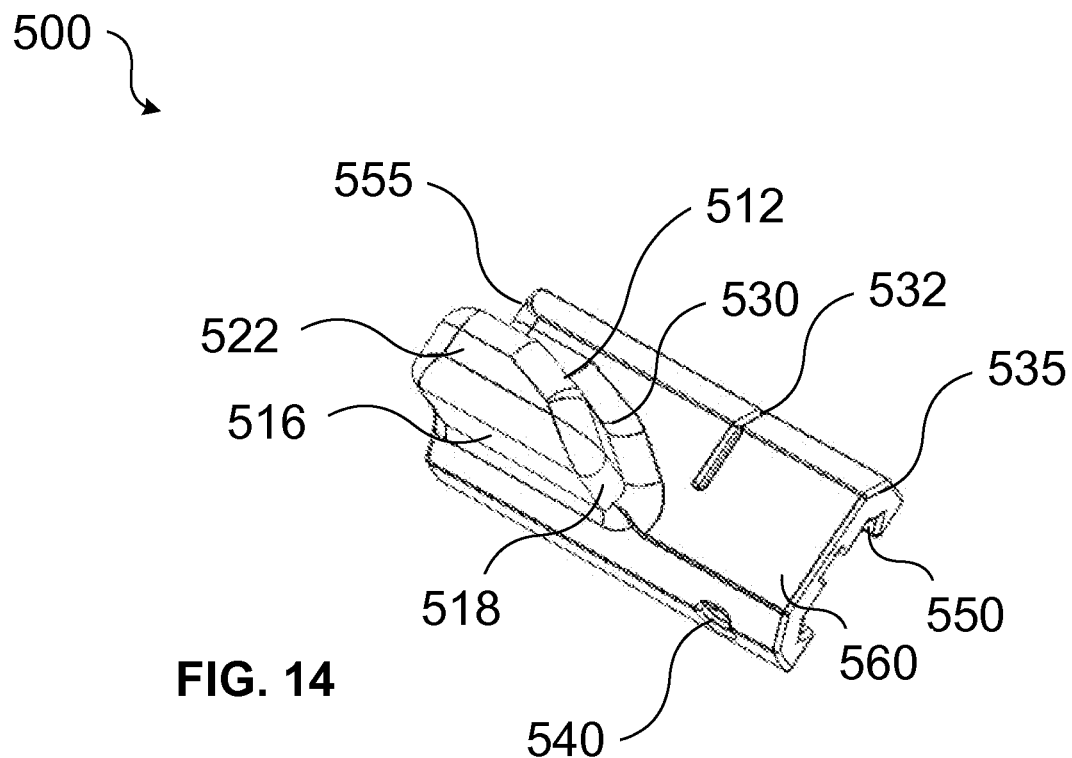
FIG. 14 shows a perspective view of a picatinny rail embodiment of a recoil grip for a rifle.
Figure 15:
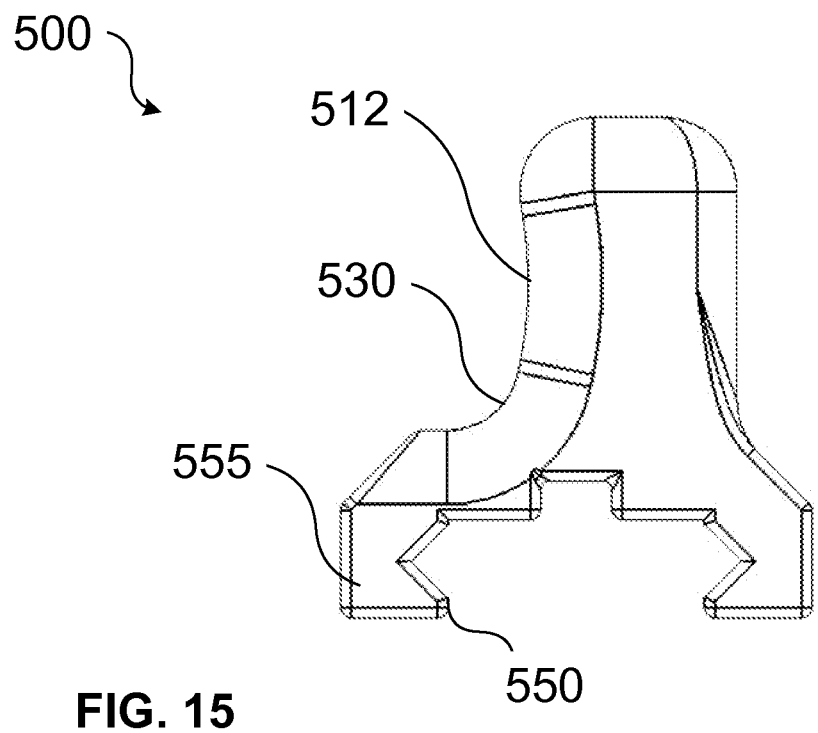
FIG. 15 shows an end elevation view of the picatinny rail embodiment of a recoil grip for a rifle.

FIGS. 14-15 show a picatinny rail recoil grip 500 for a rifle. In some embodiments, picatinny rail recoil grip 500 has a lateral grip pad 512, a contoured section 530 in similar fashion to other embodiments described herein, a front end 555 and a back end 535, and a flex slot 532. Recoil grip 500 also has a picatinny rail attachment 550 as shown in FIG. 15 from front end 555. Picatinny rail recoil grip 500 may have an attachment screw 540 for fixedly connecting the recoil grip within a picatinny rail attachment of a rifle. In some embodiments, picatinny rail recoil grip 500 may have more than one fastening screw or may use other attachment systems. In some embodiments, a picatinny rail recoil grip may have more flex slots, no flex slots, etc.

In some embodiments, recoil grip 500 includes a substantially planar surface 560 on a side between the mounting portion and the lateral grip pad. For example, the substantially planar surface can be a section of the mounting portion that the lateral grip pad is connected to and can be on a side adjacent the picatinny rail attachment, a side opposite the picatinny rail attachment, etc.

Figure 16:
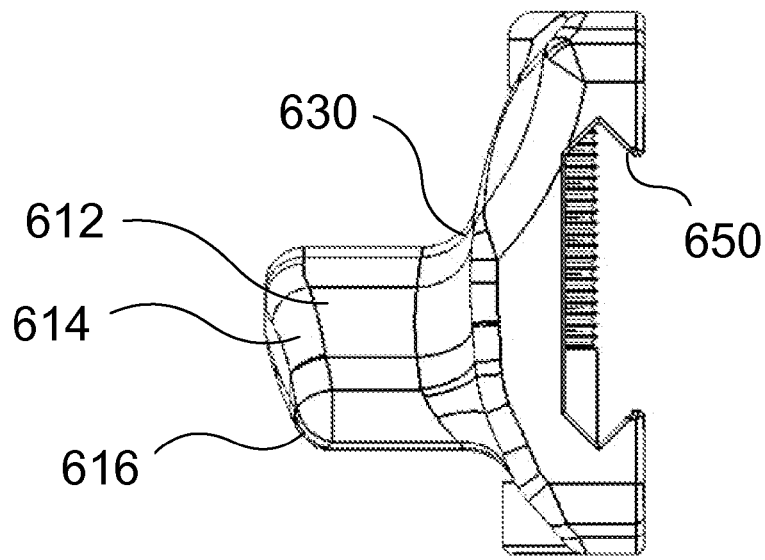
FIG. 16 shows a side elevation view of an ambidextrous embodiment of a recoil grip.
Figure 17:
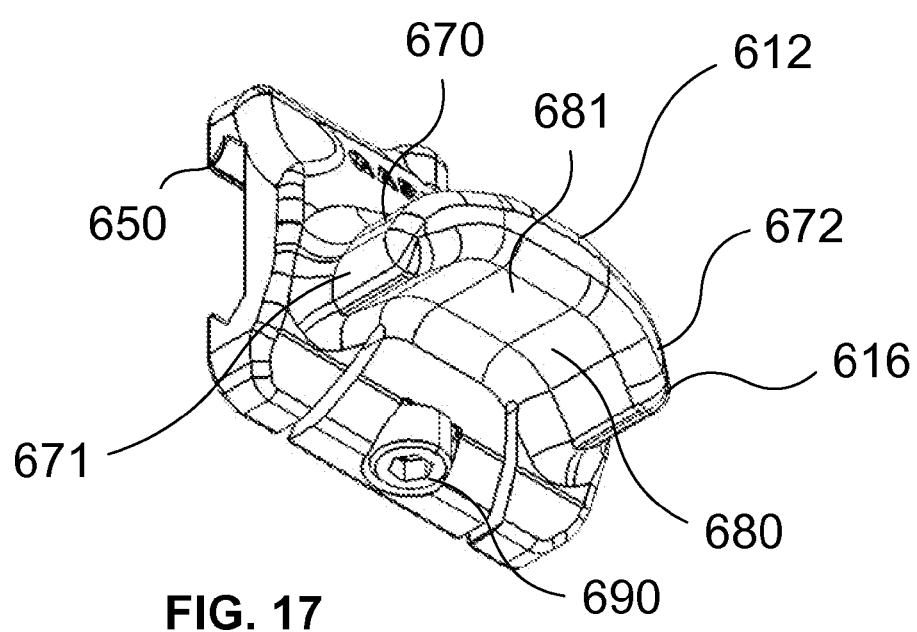
FIG. 17 shows a bottom perspective view of the ambidextrous embodiment of a recoil grip.
Figure 18:
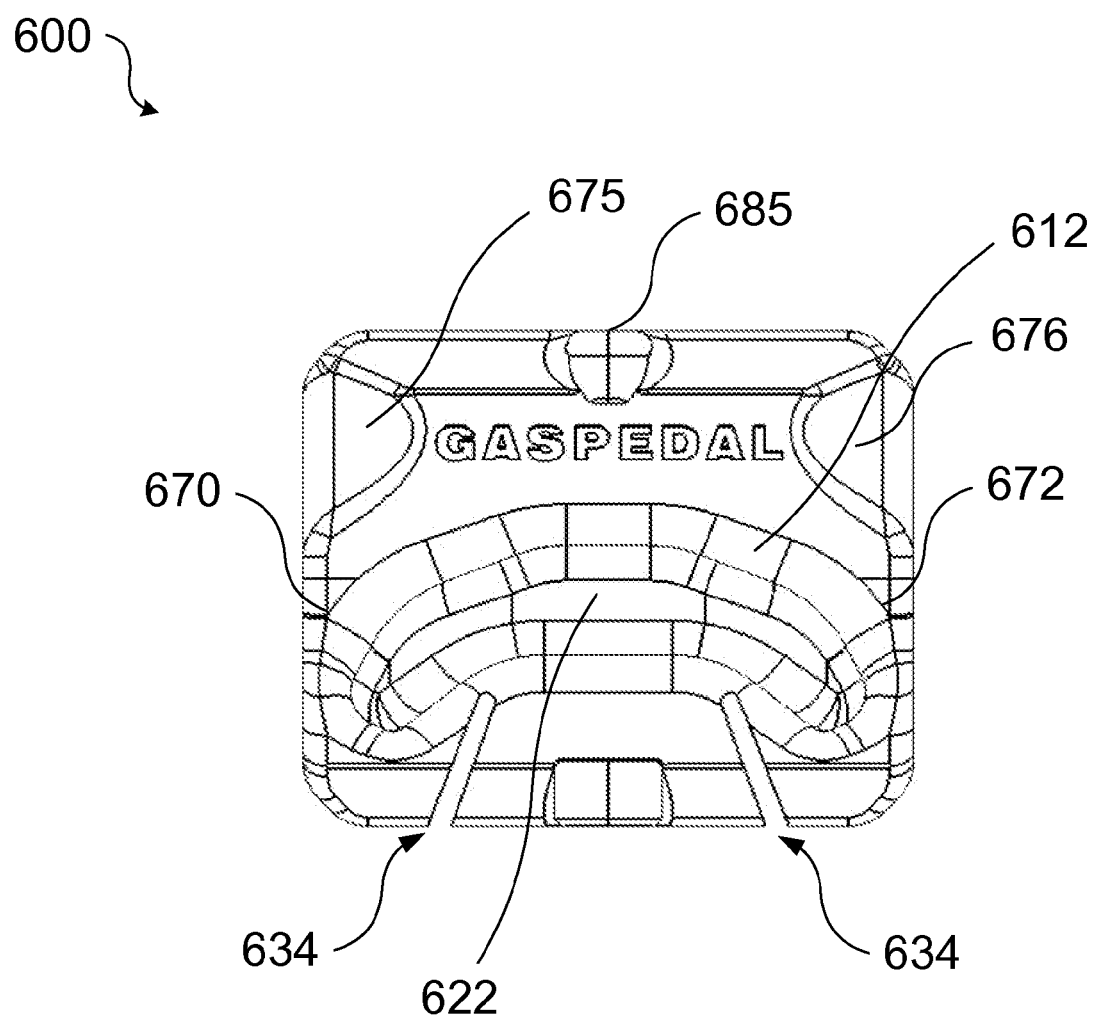
FIG. 18 shows an elevated view of the ambidextrous embodiment of a recoil grip.

In some embodiments, picatinny rail recoil grip 500 may have a rear curved portion 518 adjacent to contoured portion 530, lateral grip pad 512 and flat bottom surface 516. Additionally, lateral grip pad 512 may be adjacent to a substantially flat outer surface 522 that is situated away from the rifle on picatinny rail recoil grip 500. In this way, flat bottom surface 516, flat outer surface 522, and rear curved portion 518 can provide placement for an off-hand, an off-hand thumb, or one or more fingers of an off-hand while also reducing surfaces that may catch or hinder use of the rifle. In some embodiments, picatinny rail recoil grip 500 may have a contoured bottom surface, such as shown in the embodiment in FIGS. 16-18, which may be concave, convex, or other geometries. For example, in one embodiment a second lateral grip pad may reside on the bottom of recoil grip 500 to allow mounting the recoil grip 500 upside down and creating a different grip pad placement, different grip pad geometry. In some embodiments the second lateral grip pad may have a different geometry than lateral grip pad 512 while in other embodiments the second lateral grip pad may have a similar geometry to lateral grip pad 512. In some embodiments, picatinny rail recoil grip 500 may have a relief portion 675 as shown in FIGS. 16-18 to accommodate a metacarpal phalangeal joint of the thumb. One use of this relief portion is to allow the metacarpal phalangeal bulge a place to rest on the recoil grip to provide the ability to apply a more consistent pressure on multiple aspects of user's thumb.

FIGS. 16-18 shows an ambidextrous picatinny rail recoil grip 600. In the illustrated embodiment picatinny rail recoil grip 600 may be used for a rifle, but other embodiments are not so limited and may utilize the structure and features of the embodiments shown in FIGS. 16-18 but be mounted on handguns or other guns. Recoil grip 600 includes a lateral protrusion 612 further including a first lateral grip pad 670 and a second lateral grip pad 672. In some embodiments, lateral protrusion 612 has a concave portion 680 on one side to provide another contact for the hand of a user. In this way, recoil grip 600 may be placed on a picatinny rail or other attachment to allow for right-handed or left-handed shooting with the same recoil grip. Recoil grip 600 is also shown with two angled flex slots 634 to allow recoil grip 600 to flex slightly when affixed to a picatinny rail with a fastening screw or other tension attachment mechanism. Further, recoil grip 600 includes contoured section 672 to receive an off-hand thumb and provide three axis control in similar fashion to contoured surface 140 in the embodiment described in FIG. 1. Recoil grip 600 further includes a relief portion 675 to accommodate a metacarpal phalangeal joint of the thumb. One use of this relief portion is to allow the metacarpal phalangeal bulge a place to rest on the recoil grip to provide the ability to apply a more consistent pressure on multiple aspects of user's thumb. In the illustrated embodiment there is a second relief portion 676 in symmetric fashion to relief portion 675 to allow recoil grip to be mounted in multiple ways and therefore be used ambidextrously.

In some embodiments, recoil grip 600 may also have top to bottom symmetry. For example, top surface 612 and bottom surface 681 may be either concave or convex, or may be similar in shape while not being fully symmetrical. In some embodiments recoil grip 600 may further include a curved lateral surface 614 and a curved end portion 616. Curved lateral surface 614 and curved end portion 616 provide smooth contouring to reduce catching of the recoil grip but still provide support or placement for an off-hand. In other embodiments, recoil grip 600 may have similar convex or concave shapes on the top and bottom of the grip but may have a different angle of top surface 612 and a corresponding bottom surface, or of curved end portion 616, or contoured sections such as 671 and 672. By having a different angle on the top and bottom of the recoil grip, it could also allow adjustment to a different geometry or position by simply mounting it in a different orientation, such as on the same side of a rifle but upside down from how it was previously mounted. In some embodiments recoil grip may have a substantially flat outer surface 622, oriented away from a weapon, to allow ease of use and reduce catching yet still provide a surface for an off-hand to grip or rest on.

In some embodiments, recoil grip 600 may be mounted to a rifle or hand gun by inserting the picatinny rail angled channel 650 on a picatinny rail, sliding the recoil grip 600 along the picatinny rail to a mount location, and tightening mounting screw 690 to secure the recoil grip on the picatinny rail at the mount location. Additionally, due to the symmetric nature of recoil grip 600, it may be mounted in a plurality of orientations to provide a recoil grip for left or right-handed shooting positions. Once recoil grip 600 is mounted, it may also be adjusted and move by loosening mounting screw 690, sliding recoil grip 600 to a new position, and tightening mounting screw 690 to secure the recoil grip on the picatinny rail at a second mount location.

Recoil grip 600, when affixed to a rifle, allows a user to use an off-hand thumb to control recoil by means of placing the off-hand thumb on recoil grip 600 and using the disclosed surfaces and contours of recoil grip 600 to resist recoil. In one example, the users thumb could be placed on the top surface 612 of recoil grip 600 such that the thumb is pointed substantially toward a target and is relatively parallel to the bore of the rifle, but other embodiments are not so limited and recoil grip 600 provides multiple orientations for a user to utilize recoil grip 600 to resist recoil.

Figure 19:
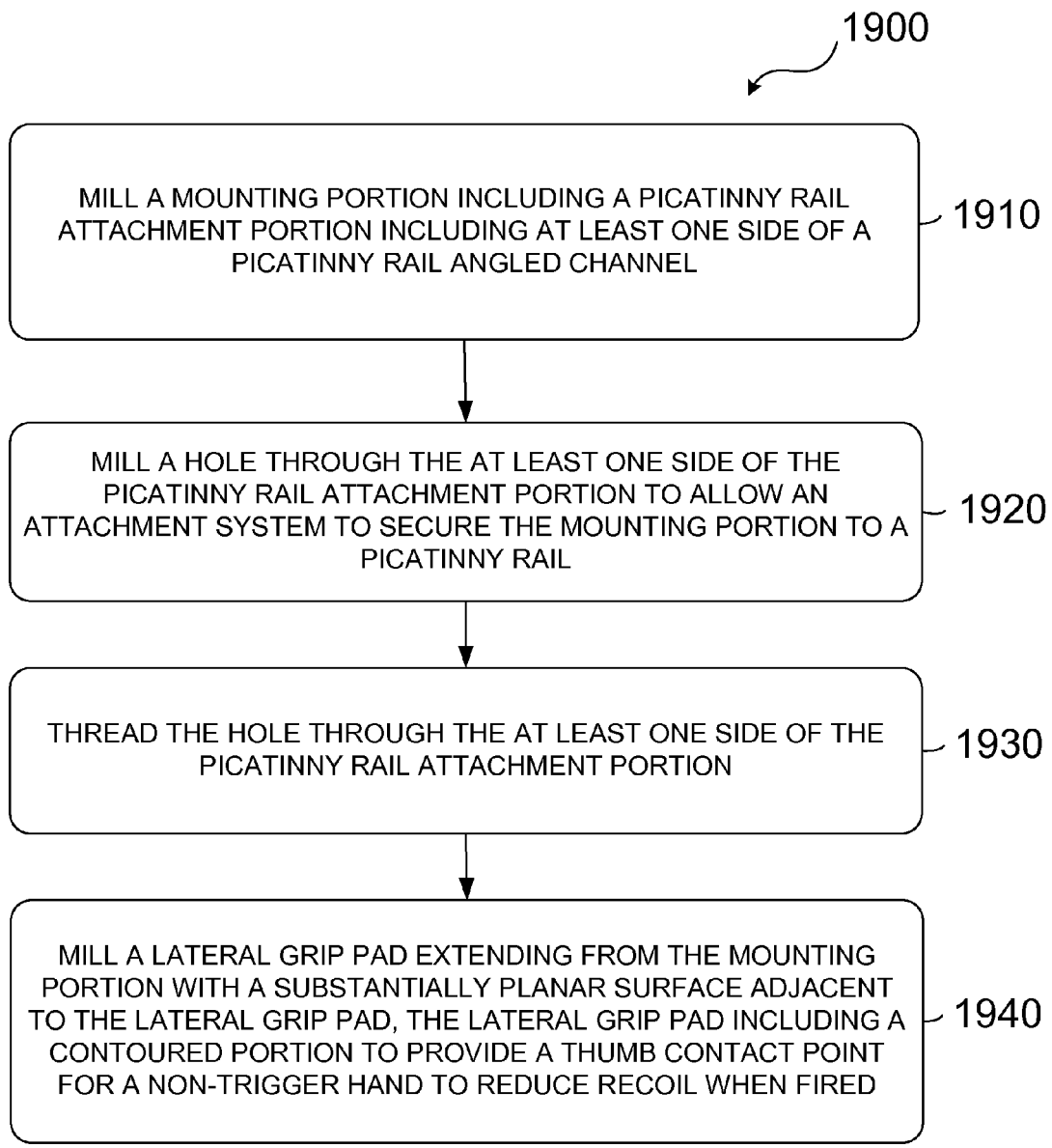
FIG. 19 shows a flowchart diagram of a method of milling an offhand recoil grip.

FIG. 19 shows a flowchart diagram of a method 1900 of milling an offhand recoil grip. For example, a method may involve making an offhand recoil grip using computer numerical controlled milling, but other embodiments are not so limited and an offhand recoil grip may be milled or made using other suitable methods. Additionally, an offhand recoil grip may be milled from a single piece of material as explained hereinabove with reference to other embodiments, but other embodiments may be a combination of multiple pieces with at least one of the combination of pieces being milled.

With reference to the FIG. 19, method 1900 includes milling a mounting portion including a picatinny rail attachment portion including at least one side of a picatinny rail angled channel, as shown in block 1910.

Then in block 1920, method 1900 includes milling a hole through the at least one side of the picatinny rail attachment portion to allow an attachment system to secure the mounting portion to a picatinny rail.

Method 1900 then includes threading the hole through the at least one side of the picatinny rail attachment portion as shown in block 1930.

Method 1900 then includes milling a lateral grip pad extending from the mounting portion with a substantially planar surface adjacent to the lateral grip pad, the lateral grip pad including a contoured portion to provide a thumb contact point for a non-trigger hand to reduce recoil when fired, as shown in block 1940. disclosed herein.

In an alternate embodiment method, an offhand recoil grip similar to embodiments shown in FIGS. 12-18 may be generated by an injection molding process or other molding processes. For example, an offhand recoil grip may be used to create a mold or mold pieces. Into the mold may be placed a moldable plastic, such as nylon, a polyethylene, nylon with some other material such as glass fibers or carbon fibers, etc. In this way, the plastic in the mold can harden in the desired shape of an offhand recoil grip. A molding process allows creation of various offhand recoil grip geometries, such as those disclosed herein in other embodiments, or even other geometries.

Additionally, a combination molding and milling process may be used where an offhand recoil grip is molded and then specific surfaces of the offhand recoil grip may be milled to a specific geometry. A combined molding and milling process allows generation of specific offhand recoil grip geometries according to a range of specifications, for specific users, for finely milled details, for surface texturing, etc.

It will further be understood that the configurations and/or approaches described herein are exemplary in nature, and that these specific embodiments or examples are not to be considered in a limiting sense, because numerous variations are possible. The specific methods described herein may represent one or more of any number of sequences involving the same limitations as claimed but in a different order.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An offhand recoil grip comprising:
    a mounting portion including a picatinny rail attachment portion;
    an attachment system to secure the mounting portion to a picatinny rail; and
    a lateral grip pad extending from the side of the mounting portion with a substantially planar surface between the mounting portion and the lateral grip pad, the lateral grip pad including a rear curved portion and a contoured portion adjacent to the rear curved portion, the contoured portion to provide a thumb contact point for a non-trigger hand to reduce recoil when fired.

2. The offhand recoil grip of claim 1, wherein the substantially planar surface adjacent to the lateral grip pad is on a side of the mounting portion opposite the picatinny rail attachment portion.

3. The offhand recoil grip of claim 1, further comprising a flex slot near the attachment system in a portion of the picatinny rail attachment portion.

4. The offhand recoil grip of claim 1, wherein the attachment system is a fastening screw connected to two sides of the picatinny rail attachment portion.

5. The offhand recoil grip of claim 1, wherein a front portion of the lateral grip pad is substantially symmetric to a rear portion of the lateral grip pad to allow ambidextrous use of the offhand recoil grip on either side of a rifle.

6. The offhand recoil grip of claim 5, further comprising at least one flex slot near the attachment system in a portion of the picatinny rail attachment portion.

7. The offhand recoil grip of claim 1, further comprising a relief portion to accommodate a metacarpal phalangeal joint of a thumb.

\* \* \* \* \*